United States Patent [19]  [11] 4,064,210
Kellogg  [45] Dec. 20, 1977

[54] METHOD FOR FEEDING AND DISCHARGING BLOW MOLDS

[75] Inventor: Robert C. Kellogg, Hartland, Mich.

[73] Assignee: Monsanto Company, St. Louis, Mo.

[21] Appl. No.: 707,470

[22] Filed: July 21, 1976

Related U.S. Application Data

[62] Division of Ser. No. 669,303, March 22, 1976, Pat. No. 3,999,927.

[51] Int. Cl.² .............................................. B29C 17/07
[52] U.S. Cl. ................................... 264/94; 214/1 BB; 264/335
[58] Field of Search ...................... 264/89, 94, 96–99, 264/334–336, 297; 425/DIG. 211, DIG. 213, DIG. 232; 214/1 BB, 152; 221/268; 65/241, 260

[56]  References Cited
U.S. PATENT DOCUMENTS 3,977,822  8/1976  Reilly et al. ............... 425/DIG. 232
3,982,635  9/1976  Chin et al. .......................... 214/1 BB Primary Examiner—Jan H. Silbaugh
Attorney, Agent, or Firm—Michael J. Murphy

[57] ABSTRACT

A method for feeding and discharging a blow mold employs a carrier tube adjacent the mold cavity for temporarily storing a workpiece, a discharge chute coaxially above the mold cavity, cam-positioned, slidably journaled shafts for moving the tube transversely through a slot in the discharge chute into and out of mold loading position and a stop plate blocking the delivery end of the tube when in storage position. The method involves charging a preform to the carrier tube moving with the mold while a preform is being molded into an article therein, opening the mold and ejecting the article through the discharge chute and transferring the carrier tube laterally to a mold-loading position on the cavity axis within the discharge chute while removing an obstruction at the base of the tube during such movement to permit the preform to exit the tube into the mold.

1 Claim, 3 Drawing Figures

METHOD FOR FEEDING AND DISCHARGING BLOW MOLDS

This is a division of application Ser. No. 669,303, filed Mar. 22, 1976, now U.S. Pat. No. 3,999,927.

CROSS REFERENCE TO COMMONLY OWNED, RELATED APPLICATIONS

1. U.S. Ser. No. 558,841, filed Mar. 17, 1975, now abandoned
2. U.S. Ser. No. 642,936, filed Dec. 22, 1975, now Pat. No. 3,977,822.

BACKGROUND OF THE INVENTION

This invention is directed toward movement of articles into and out of blow molds and more particularly to process improvements to facilitate efficient blow mold loading and discharging.

As set forth, for example in U.S. Pat. No. 3,415,915, it is known to position previously formed workpieces within blow mold sections for further shaping into finished articles. As set forth in commonly owned, copending application Ser. No. 558,841, filed 3/17/75, now abandoned, it is likewise known to hold such workpieces in waiting adjacent the blow mold in which it is to be remolded in order that it be available immediately on mold opening, thereby improving the system efficiency in comparison with others wherein the workpieces are charged to the mold from a prior upstream processing station in which it may have been formed or treated in some manner. In such latter high throughput systems utilizing moving molds, if the time required to deposit the workpiece in the open mold moving by the upstream station is greater than the interval necessary for the mold to pass by such station, the mold cannot be charged with the workpiece unless the system and its corresponding rate are undesirably slowed or the number of mold stations are uneconomically increased to offset such slowing of the system.

SUMMARY OF THE INVENTION

Accordingly, it is a principal object of this invention to provide method improvements for increasing the efficiency of a blow mold by minimizing the time interval per cycle when the mold must be open to receive the next part for molding, and maximizing the mold-closed, article-forming interval per cycle.

An additional object is to provide efficiency improvements in loading and discharging blow molds with workpieces to be remolded.

A further object is to provide means for carrying out the prior objects.

Other objects of this invention will in part be obvious and will in part appear hereinafter.

These and other objects are accomplished by providing apparatus for feeding and discharging a blow mold comprising a carrier tube adjacent a cavity in the blow mold for temporarily storing a workpiece, a discharge chute substantially coaxial with the longitudinal axis of the cavity, means for moving the tube with respect to the chute to bring such tube into and out of mold loading position, and means obstructing the delivery end of the tube when in storage position.

Also provided is a method of feeding and discharging a blow mold comprising charging a preform from an upstream station to a carrier tube adjacent to and moving with a blow mold while a prior preform is being molded therein, opening the mold and forcibly discharging the article upwardly along the mold axis through a guide chute, transferring the carrier tube laterally to a mold loading position within the guide chute, and removing an obstruction at the base of the tube during such transfer movement to permit the preform to exit the tube into the mold.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 1:
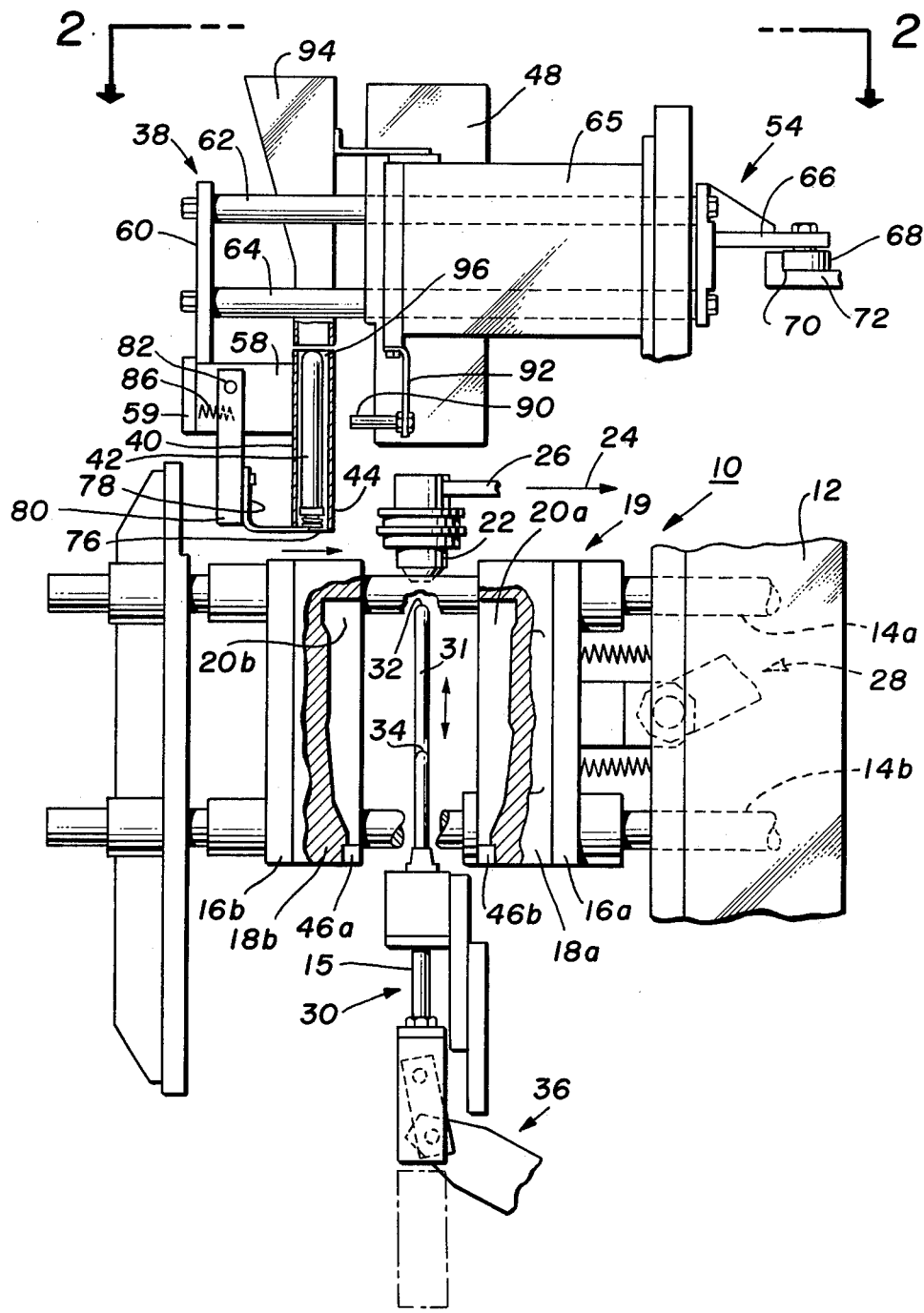
FIG. 1 is a front, elevational view, partly in section, of a blow mold station just prior to charging with a workpiece and just after discharging a prior formed article.

Referring now to the drawings, there is shown in FIG. 1, a blow mold station, generally indicated as 10, radially extending and supported from a face of vertically disposed turret 12 preferably mounted for continuous movement in a vertical plane through a circular path via conventional power means, not shown. Though only one station 10 is necessary, a plurality of identically constructed versions of same are preferred to provide a large volume system, each of such other stations being located horizontally adjacent each other, equi-spaced about a vertical axis and protruding from a face of turret 12. In lieu of such mounting of station 10, it may be fixed in place and not associated with a rotary turret, or intermittently movable in a stepwise fashion, or movable through a non-circular, e.g. diagonal path.

Station 10 includes a pair of fixed, horizontal stress bars 14a, 14b movable with turret 12 carrying a pair of platens 16a, 16b supporting laterally separable, vertically disposed mold sections 18a, 18b, which, together with end plug 22, form blow mold 19. Each section 18 is provided with a complementary cut out portion 20a, 20b which together form cavity 20 within mold 19 when the latter is in closed position. When the contour of the container or other article to be formed dictates, an end plug 22 operably movable vertically and horizontally in the direction of arrow 24 via a suitable actuator associated with rod 26 may optionally be provided for nesting cooperation with sections 18 to define the contour of the end wall of the article being formed. Otherwise such end wall may be defined by appropriately configured integral portions of sections 18. A suitable platen actuating mechanism 28 comprising a mechanical linkage actuated by a cam means or equivalent, not shown, slidably urges sections 18 toward and away from each other on bars 14 to open and closed mold 19. In the illustrated embodiment, upper and lower bars 14 lie in a vertical plane bisecting the center of station 10 with mold 19 being laterally outboard of such plane. In lieu of the particular platen type structure just described wherein mold sections move radially to a vertical axis during opening and closing, alternate systems may be used, such as those wherein the sections pivot about an axis in clamshell fashion.

Rod means, collectively identified as 30, are provided for and are movable with each mold 19 which includes a stretch pin 31 extensible such that forwardmost, preform-receiving end 32 can be positioned vertically immediately subjacent end plug 22 when the latter is in molding position, and retractable to the position of end 32 which is indicated in outline at 34 substantially on the longitudinal axis of the mold cavity 20. Such upper and lower positions of pin 31 correspond respectively to workpiece-receiving and workpiece seating positions within mold 19. Movement between such positions is accomplished by a suitable mechanical actuating linkage 36, or equivalent, such reciprocable movement being synchronized with the opening and closing movements of the mold sections and the positions of the components of the loading and discharge apparatus, about to be described.

Figure 2:
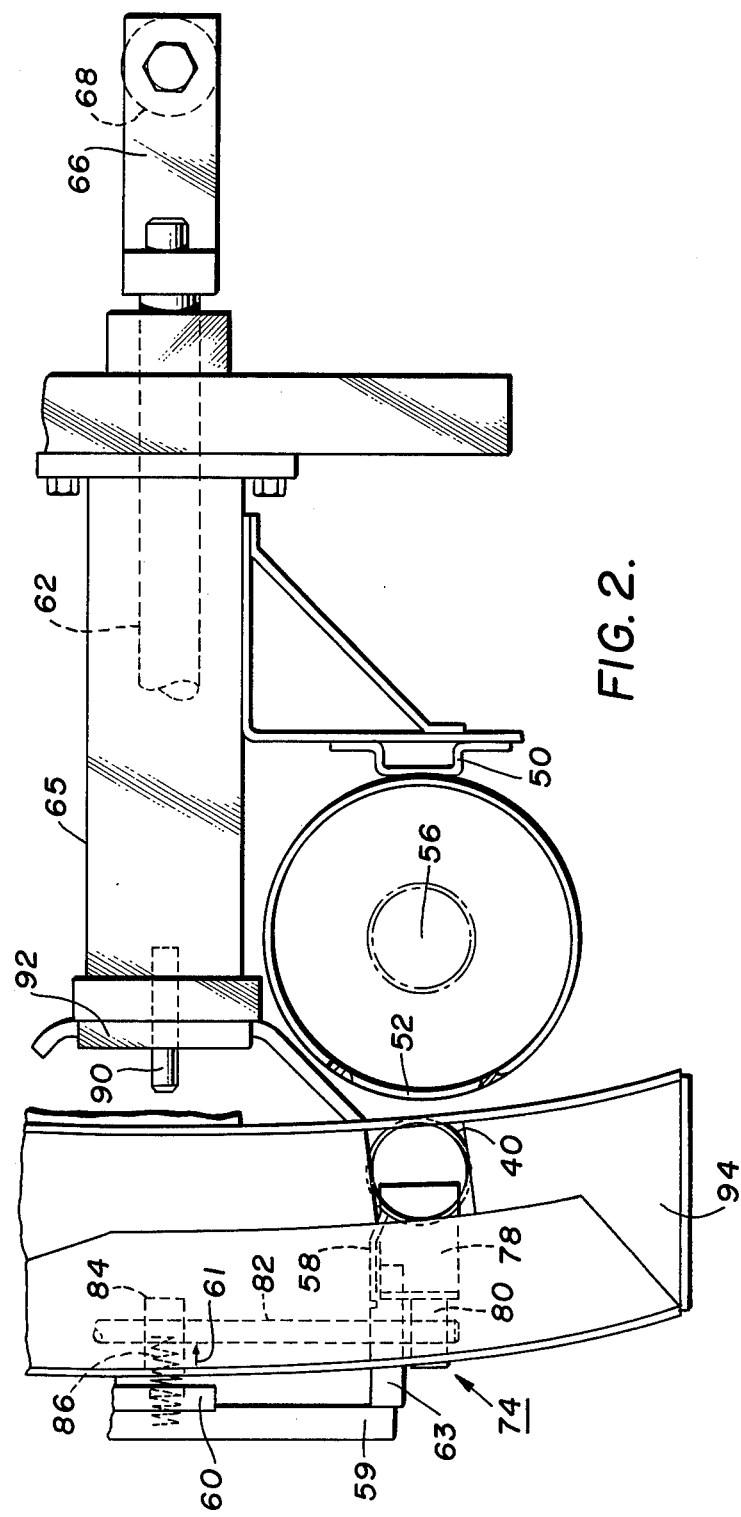
FIG. 2 is a partial plan view along 2-2 of FIG. 1.

In accordance with the invention, apparatus collectively identified as 38, is provided for feeding workpieces to and discharging molded articles from blow mold 19, one such apparatus 38 being supplied for and movable with each mold station 10. Apparatus 38 specifically comprises a carrier tube 40 illustratively shown as cylindrical and which is open at each end and located above and preferably separated from mold 19 for temporarily storing a workpiece 42 therein prior to further molding thereof. In the illustrated embodiment, workpiece 42 is in the form of a previously molded tubular preform having an open end surrounded by a finish portion 44 which seats within complementary cutouts 46a, 46b of mold 19 when such preform is in a workpiece-seated position. Apparatus 38 further comprises open ended discharge chute 48 laterally adjacent tube 40 which is vertically disposed adjacent to and substantially coaxially above the longitutinal axis of mold cavity 20 and preferably fixed in place via a suitable support clip 50 (FIG. 2). The open cross section of chute 48 may vary from the cylindrical shape shown as can its particular orientation in space, such requirements being dictated by the size and shape of the molded article and the location of the next downstream component for receiving such article after passage through chute 48. For example, such chute (as well as tube 40) could be oval, square etc. in cross section and/or angularly tilted in space. Though such chute is preferably fixed in place for purposes of simplicity of construction, it could be mounted for movement into and out of coaxial alignment with the mold axis. It may even be possible to dispense with chute 48 entirely when, for example, the mold station is stationary or moving slowly and the next downstream structure is immediately adjacent the mold, or to provide one fixed chute for a multi-station assembly situated in a predetermined position above a particular place in the path of mold movement where the molded articles are discharged successively. Chute 48, in the preferred illustrated embodiment especially useful in a high volume molding system, is provided with a slot 52 in its wall facing tube 40 of a sufficient height and width to accomodate movement of tube 40 into chute 48 to the FIG. 3 position coaxially above mold cavity 20.

Means 54 are provided for laterally reciprocating tube 40 through slot 52 to bring tube 40 into and out of mold loading position within such chute on axis 56 (FIG. 2), and specifically comprise tube support clip 58 secured to plate 63 extending from horizontal support 59 from which bar 60 projects upwardly and supports one end of each of a pair of vertically separated, transversely extending shafts 62, 64 which are slidably journaled in horizontal bores in fixed housing 65. Shafts 62, 64 are secured at their opposite ends to fixture 66 supporting a journaled follower 68 rollingly movable along contour surface 70 of fixed cam 72 during rotary movement of turret 12.

Means (FIGS. 1 and 2), collectively identified as 74, obstruct the lower delivery end 76 of tube 40 during a portion of the molding cycle and comprise L-shaped stopper plate 78 fastened to upright member 80 rigid with horizontally disposed pivot shaft 82 which is mounted for oscillation via conventional bushings, not shown, in a pair of laterally spaced plates, one being shown at 63. Compression spring 86 has one end seated in a pocket formed in bar 60 and its other end compressively abutting arm 84 which is rigid on shaft 82 midway between its ends. Thus, with such structure, stopper plate 78 is mounted for arcuate movement about a horizontal pivot extending perpendicular to shafts 62, 64, and is biased in the direction of arrow 61 toward a blocking or obstructing position when tube 40 is in the storage position of FIGS. 1, 2. When plate 78 is in such obstructing position, its horizontal leg underlies tube delivery end 76. Fixed pin 90 on bracket 92 projects toward arm 84 and abuttingly obstructs further movement of plate 78 as carrier tube 40 is laterally urged toward the loading position of FIG. 3 by means 54.

Fixed loading hopper 94 open at each end and supported from stationary housing 65 is above carrier tube 40 for receiving successive preforms 42 and channeling them downwardly via appropriately contoured sides into tube 40.

In operation, as station 10 traverses a predetermined path during one molding cycle, discharge chute 94 passes beneath an upstream source, not shown, of preforms 42 at elevated molding temperature, whereupon at the proper instant, such preform is released into chute 94 and, with open end leading, is guided downwardly by gravity through open end 96 and into tube 40, which, as mentioned, is moving with mold 19, until it comes to a stop against plate 78 which is in the blocking position of FIG. 1. At this point in the cycle of loading tube 40, mold 19 is preferably closed and involved with molding a prior preform into the shape of cavity 20, such just-charged preform 42 being held in waiting in tube 40 immediately adjacent its mold cavity and available to the mold the instant after the prior molded article is discharged.

As station 10 proceeds further in its circular path, sections 18 begin to separate as platens 16 move away from each other on bars 14 until mold 19 is in the fully open position of FIG. 1 exposing a completely blown plastic article such as a bottle 98 astride extended stretch pin 31. In conjunction with such separation of the sections, mold end plug 22 is initially moved incrementally vertically and then in a horizontal arc until out of alignment with and clear of the formed container impaled on pin 31. High pressure air is next introduced via conventional means, not shown, through rod means 30 and pin 31 into the formed article to cause such bottle to forcibly jet upwardly through the open ends of discharge chute 48 to a suitable downstream station, the outline of such a bottle being shown at 98 in FIG. 3. As turret 12 continues its rotating movement, follower 68 encounters an inwardly directed (towards the turret) portion of the surface contour 70 of cam 72 which draws tube 40 and preform-obstructing stopper plate 78 toward the right in FIG. 1 in synchronism with the position of mold 19 in its circular path of travel, so as to eventually bring tube 40 into a mold loading position above the now depleted, still-extended stretch pin 31. During such displacement to the position of FIG. 3 within guide chute 48, arm 84 strikes pin 90 whereupon continued movement of shafts 62, 64 moves tube 40 laterally out from over the leg of plate 78 while serving to further compress spring 86 such that the obstruction at the base of tube 40 is removed permitting preform 42 to exit tube 40 and fall by gravity onto the waiting extended rod 31 to the eventual position indicated in FIG. 3 at 96.

Figure 3:
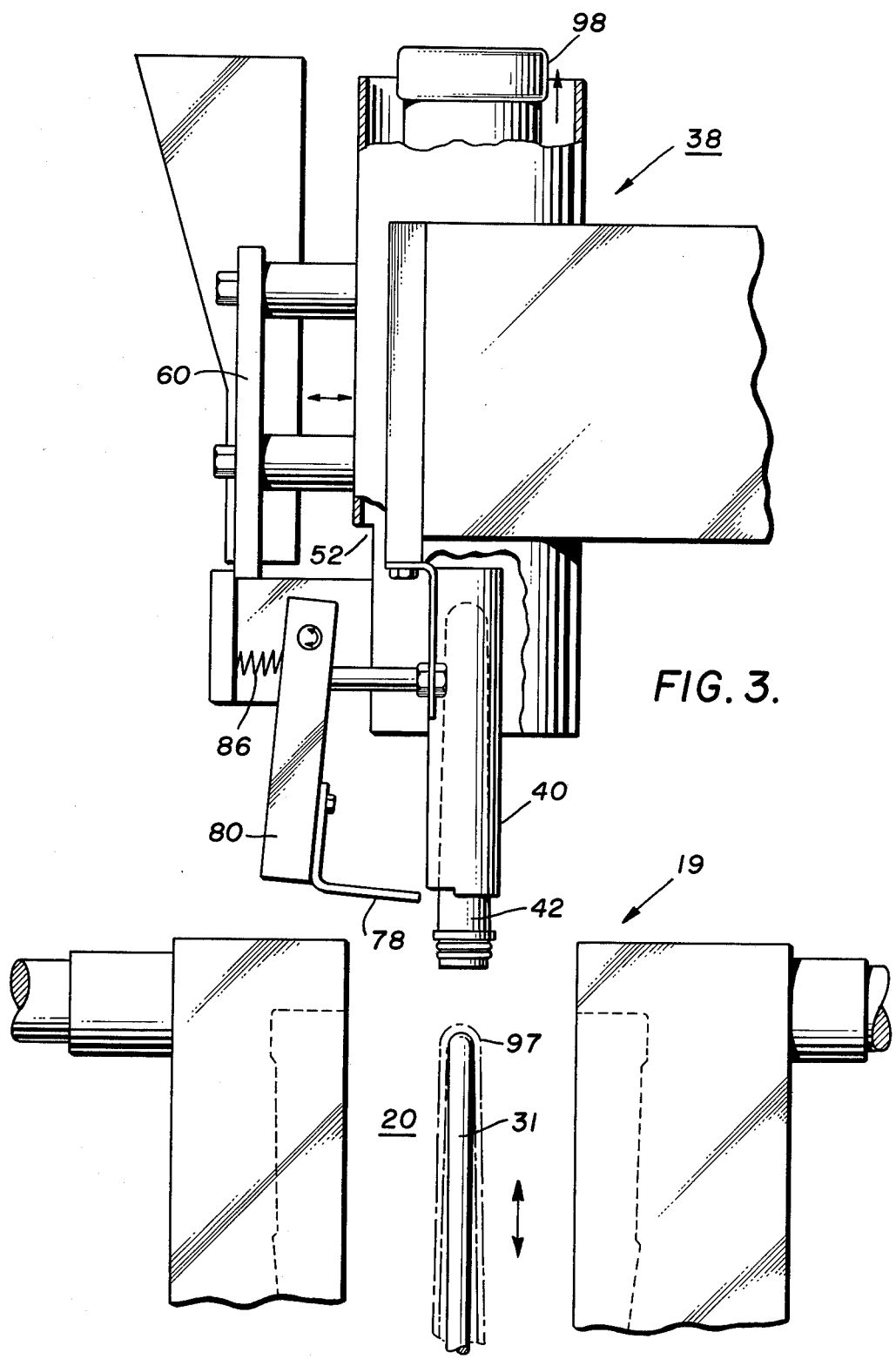
FIG. 3 is a schematic view of the apparatus of FIG. 1 during loading of the mold with a workpiece.

After tube 40 has moved sufficiently back toward the FIG. 1 position as to avoid interference with plug 22, platens 16 and therefore sections 18 are drawn toward each other and mold plug 32 synchronously moved in between to close mold 19. During continued circular movement and prior to complete mold closure, stretch pin 31 with preform 32 impaled thereon in the manner depicted at 97 in FIG. 3 is caused via actuator 36 to retract downwardly until finish 44 is aligned between and ready for acceptance within portions 46 of mold sections 18, which portions 46 may alternately be provided separate from and movable independent of sections 18. After such mold is, or as it is being closed, stretch pin 31 is raised via actuator 36 to its extended position stretching preform 32 vertically, whereupon prior to or after pin 31 reaches the limit of its stroke corresponding to the position shown in FIG. 1, blow air is introduced into the confined and stretched preform to cause the thermoplastic material to balloon outwardly against the surfaces defining cavity 20 thereby creating the walls of container 98 (FIG. 3).

Further movement of the turret and mold station again brings the latter into position adjacent the upstream source of preforms whereupon the next heated preform is dropped via chute 94 into storage position within carrier tube 40 while the blown plastic within mold 19 is being chilled and set in conventional manner via circulation of a suitable cooling medium through channels (not shown) in sections 18 and plug 22, and during continued movement of the turret until the mold begins to open to allow charging of the next preform and discharging of the formed article in the manner previously described.

Various modifications and alterations of the invention will be readily suggested to persons skilled in the art. It is intended therefore, that the foregoing be considered as exemplary only and that the scope of the invention be ascertained from the following claims.

What is claimed is:

1. A method of feeding and discharging a blow mold comprising:
   A. charging a preform from an upstream station to a carrier adjacent to and moving with a blow mold while a prior preform is being molded therein;
   B. opening the mold and forcibly discharging the article upwardly along the mold axis through a guide chute fixed with respect to the mold axis;
   C. transferring the carrier laterally to a mold loading position within the guide chute; and
   D. removing an obstruction at the base of the carrier during such transfer movement to permit the preform to exit the carrier into the mold.

* * * * *